United States Patent

[11] 3,553,354

[72] Inventors Shanti S. Gupta
Evanston;
Sam P. Stamatis, Glenview, Ill.

[21] Appl. No. 615,005
[22] Filed Feb. 9, 1967
[45] Patented Jan. 5, 1971
[73] Assignee Wells-Gardner Electronics Corporation
Chicago, Ill.
a corporation of Illinois

[54] SYNCHRONOUS AM DEMODULATOR
6 Claims, 5 Drawing Figs.

[52] U.S. Cl. ........ 178/5.4, 329/50
[51] Int. Cl. ........ H04n 9/50
[50] Field of Search ........ 178/5.4, 5.4SD; 329/50

[56] References Cited

UNITED STATES PATENTS 2,917,573 12/1959 Holmes ........ 178/5.4(SD)
3,243,707 3/1966 Cottrell ........ 329/50

*Primary Examiner*—Richard Murray
*Attorney*—Robert L. Slater, Jr.

ABSTRACT: A demodulator system for color television receivers having two substantially identical demodulator means for demodulating respectively the red and blue color signals, each of the demodulator means comprising a combination demodulator and amplifier for the chrominance signal and a gate having a "cutoff" condition and a saturated condition whereby the chrominance signal is amplified and demodulated only when the gate is saturated.

Inventors:
Shanti S. Gupta
Sam P. Stamatis
By: Robert L. Slater, Jr.
Atty.

Inventors:
Shanti S. Gupta
Sam P. Stamatis
By: Robert L. Slater, Jr.
Atty.

SYNCHRONOUS AM DEMODULATOR

BACKGROUND

This invention relates to synchronous demodulator and detector circuits and pertains more particularly to, although not entirely limited to, synchronous amplitude demodulators for color television receivers.

Color television signals transmit luminance data and chrominance data via separate but phase and frequency interrelated carrier waves. The luminance signal is the portion of the color picture signal utilized by monochrome receivers. The luminance signal is referred to as the Y signal and the luminance voltage as $E_y$. The specifications of the luminance signal take into consideration the response of the human eye to various light frequencies. Accordingly, the $E_y$ voltage may be expressed in terms of $E_R$, $E_G$, and $E_B$ the respective voltages of the red, green and blue signals, thus $E_y = 0.30E_R + 0.59E_G + 0.11E_B$.

The chrominance signal carries data for the three primary colors, red, green and blue. It is not necessary under present FCC rules to transmit the color data for each primary color separately; accordingly, the chrominance signal is comprised of two functions, I and Q, each of which carries a specified portion of the color data for each of the primary colors, red, green and blue. The voltage of the functions I and Q may be defined in terms of color function voltages as follows:

$$E_I = .60E_R - .28E_G - .32E_B$$
$$E_Q = .21E_R - .52E_G + .31E_B$$

The chrominance signal is transmitted as a double sideband suppressed carrier wave modulated on tow quadrature axes by the respective I and Q functions.

In the color television receiver the color data may be recovered by demodulating the chrominance signal to recover the I and the Q functions which when combined in a matrix circuit will yield the primary color functions for application to the respective color tube grids. Alternatively, the chrominance signal will yield the color functions for red and blue directly upon appropriate demodulation, and the green function can be reconstructed by linear summation of the resultant R-Y and B-Y functions. Color function demodulation depends upon the fact that the primary color functions are readily expressed in linear equations in terms of the I, Q and Y functions. For instance:

$$E_R = .96E_I + .63E_Q + 1.00E_Y$$
$$E_B = -1.11E_I + 1.72E_Q + 1.00E_Y$$
$$E_G = .28E_I - .64E_Q + 1.00E_Y$$

Heretofore, synchronous amplitude demodulation of the I and Q functions or the R-Y and B-Y functions has been possible only with use of vacuum tube circuits. The phase and linearity tolerances required for reproducing the color image are extremely small; conventional vacuum tube means had enabled color television receiver designers to hold the exacting conditions. Vacuum tube diodes in conventional demodulator circuit arrangements have found use in color television demodulation. Diodes, while excellent detector devices, do not exhibit gain. Amplifier stages must then be placed at the output of the demodulators. Since the color functions must be combined in exact proportions in the color tube, the post demodulator amplifiers, unless of stable precision design, readily distort the color data and degrade the color image. A second vacuum tube synchronous demodulation system utilizes pentode tubes wherein the chrominance signal is applied to control grids and a CW reference signal is applied to the suppressor grids. When the pentode tube is used the recovered demodulated signal is mixed with the reference voltage which must be removed by means of a filter network in the pentode plate circuit. The limited band width of the filter networks and the time delay encountered in the passage of the demodulated signals through the filters increases the complexity of the demodulation circuits and often gives rise to color distortion and unbalanced color images.

The vacuum tube color demodulation circuits in general require sizeable power resources to operate and require dissipation of the resultant heat. Vacuum tube circuits are bulky and fragile. Two of the commonly used vacuum tube demodulator circuits referred to above fall short of the ideal color synchronous demodulators and require combination with additional circuit components to approximate the required color demodulator specifications.

SUMMARY OF INVENTION

Briefly stated the present invention comprises a synchronous amplitude demodulator system utilizing solid state components wherein demodulation and amplification is performed in a single stage. The invention is useful in a variety of applications where the carrier signal has been modulated on one or more axes and the intelligence must be recovered by synchronous amplitude demodulation. The embodiments of the invention described in the following illustrations and specification are applicable to demodulation of color television chrominance signals.

The present invention utilizes a transistor biased for Class A operation coupled to a second solid state intermittent gate. The gate is regulated by a reference signal phased to actuate the Class A amplifier during a critical phase angle of the input signal from which the demodulated signal may be derived.

Accordingly, one object of our invention is to provide an improved all solid state synchronous amplitude demodulator.

Another object of our invention is to provide in a single solid state stage a combined synchronous amplitude demodulator and amplifier.

Still another object of our invention is to provide a transistorized synchronous amplitude demodulator adaptable to a variety of applications.

Another object of our invention is to provide a reliable compact transistorized synchronous amplitude demodulator system for color television receivers wherein no phase shifting of the chrominance signal is required in the demodulation process.

These and other objects and advantages of our invention will appear from the following illustrations, specifications and claims.

DRAWINGS

DESCRIPTION OF PREFERRED EMBODIMENTS OF THE INVENTION

Figure 1:
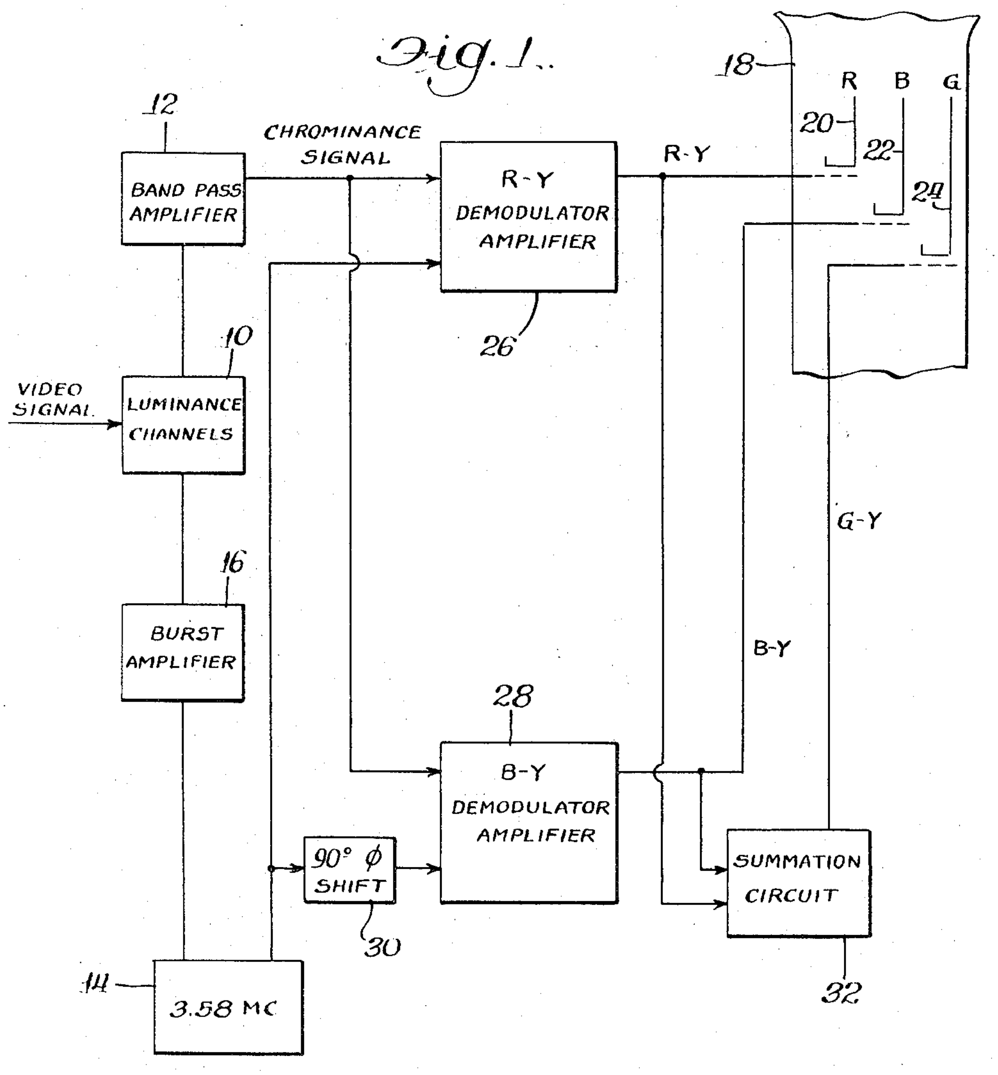
FIG. 1 is a block diagram descriptive of a fragment of a color television receiver in which a preferred embodiment of our synchronous demodulator system has been applied.

Referring now to the drawings, FIG. 1 is a schematic block diagram of a fragment of a color television receiver in which a preferred embodiment of our invention has been applied. The chrominance signal as shown in the diagram is passed through a band-pass amplifier 12, the input of which is derived from a multistage amplifier shown on the diagram at 10 and labeled Luminance Channel. The chrominance signal is further illustrated in FIG. 2*a* in a solid line and where the voltages of the component functions, I and Q, are superimposed in broken lines.

A reference CW signal of approximately 3.58 mc. is locally generated in color receivers, an oscillator is shown schematically in the drawing at 14. The phase of the reference signal is controlled by means of a keying signal derived from the Burst Amplifier and Keyer shown at 16. A fragment of the kinescope 18 with color grids red, 20, blue, 22, and green, 24, is also shown in schematic form. The color difference signals R–Y, B–Y and G–Y are applied to the respective red, blue and green grids of the kinescope. Although not illustrated in FIG. 1, the luminance signal voltage, Ey, is introduced into the cathode of the kinescope.

Two synchronous amplitude demodulator circuits 26 and 28, described in greater detail below, are connected in parallel array. The output of the R–Y demodulator 26 is connected directly to the red grid 20, and the output of the B–Y demodulator 28 is connected to the blue grid 22.

The demodulation circuits, 26 and 28, require two input signals. The first being the chrominance signal and the second input being a reference signal. It is noted by reference to the drawing that the reference signal is connected directly to the R–Y demodulator 26, and is connected through a quadrature phase shift circuit, 30, to the B–Y demodulator circuit 28.

The G–Y function may be derived from linear addition of the R–Y and B–Y functions. The block diagram shows the summation circuit at 32. The demodulator circuit shown in the block diagram 26 and 28 is illustrated in FIG. 3.

Figure 3:
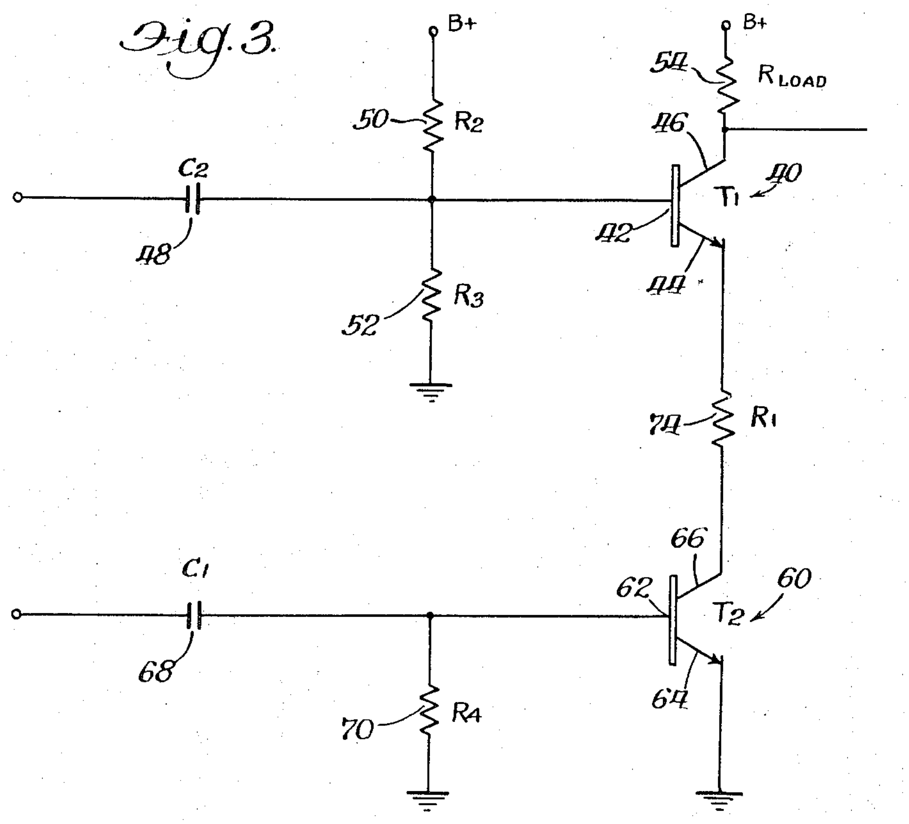
FIG. 3 is a circuit diagram showing a portion of the embodiment of our invention illustrated in FIG. 1.

Referring now to FIG. 3, the preferred embodiment of the demodulator circuit comprises and NPN transistor $T_1$ shown at reference numeral 40. Transistor $T_1$ has a base 42, an emitter 44 and a collector 46. The chrominance signal is capacitively coupled to the base of $T_1$ through capacitor $C_2$ shown at reference numeral 48. The base of transistor $T_1$ is biased between DC voltage B+ and ground by means of resistors $R_2$ and $R_3$, 50 and 52 respectively. The collector 46 of transistor $T_1$ is connected through a resistor $R_{load}$, 54, to a B+ DC voltage. A connection to the appropriate color grid in the kinescope 18 is made directly from the collector of transistor $T_1$.

NPN transistor $T_2$, 60, having a base, 62, an emitter, 64, and collector, 66, is utilized as an intermittent switch regulated by the reference signal which in the illustrated embodiment is a 3.58 mc. CW subcarrier. The subcarrier is capacitively coupled to the base 62 of transistor $T_2$ through the capacitor $C_1$, at 68. Appropriate bias of the base lead of transistor $T_2$ is maintained by resistor $R_4$, 70, connected to ground and capacitance $C_1$, 68. The collector 66 of transistor $T_2$ connects to the emitter 44 of transistor $T_1$ through a resistance $R_1$ at 74. The emitter 64 of transistor $T_2$ is grounded.

Figure 4:
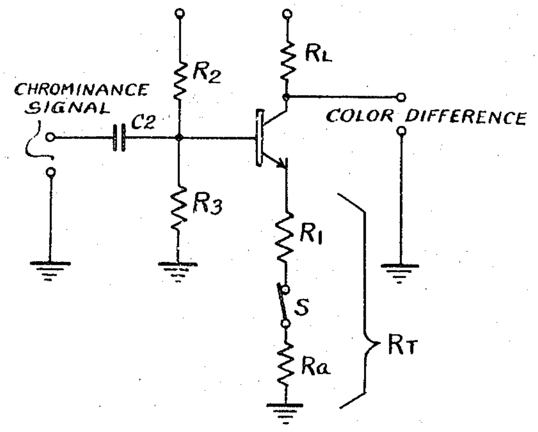
FIG. 4 is an equivalent circuit diagram of the embodiment of our invention illustrated in FIGS. 1 and 3.
Figure 5:
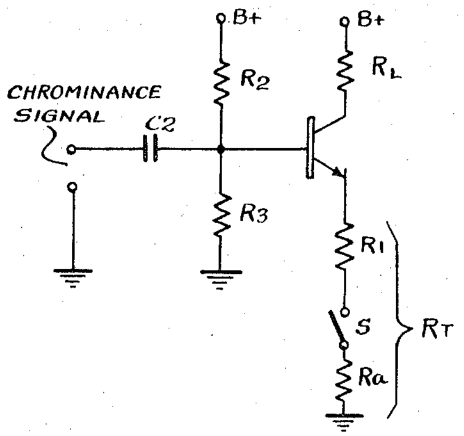
FIG. 5 is a variation in the equivalent circuit diagram illustrated in FIG. 4.

FIGS. 4 and 5 are equivalent circuits of the embodiment of our invention shown in FIG. 3. In either of FIGS. 4 and 5 transistor $T_1$ is analagous to the transistor $T_1$ of FIG. 3. Similarly input capacitor $C_2$, bias resistors $R_2$ and $R_3$ and load resistor $R_{load}$ are in all respects analagous to the same circuit elements described above in the circuit illustrated in FIG. 3.

The resistance $R_a$ shown in both FIGS. 4 and 5 is an equivalent of the emitter-collector resistance of transistor $T_2$ of FIG. 3. $R_a$ varies from near zero to infinity during each cycle of the reference CW signal. $R_t$, which is the sum of resistances $R_1$ and $R_a$, forms the emitter resistance of transistor $T_1$. The switch $S_1$, shown in FIG. 5, further emphasizes the switching or chopping action of transistor $T_2$. During a nonconducting interval transistor $T_2$ presents an infinite resistance and is represented in FIG. 5 as an open switch S. During a conducting interval, $T_2$ is represented as shown in FIG. 4 with switch S closed and resistance $R_a$ grounded.

When the chrominance signal and the subcarrier CW reference signals are each at zero voltage, the demodulator circuit is inoperable and collector 46 of transistor $T_1$ in a no output signal condition. Transistor $T_2$ is cut off. Transistor $T_1$ is biased for Class A operation but the emitter 44 connected to cutoff transistor $T_2$ holds transistor $T_1$ inoperable.

The 3.58 mc. carrier is coupled through $C_1$ and the positive half of the cycle causes transistor $T_2$ to saturate. Because of the time constant due to capacitor $C_1$ and resistance $R_4$, a residual negative potential is developed from the base of transistor $T_2$ to ground which causes transistor $T_2$ to have a conduction angle of less than 180°. This in turn determines the efficiency of the recovered signal. Because of the chopping action that takes place at the collector of transistor $T_2$, the impedance from that point to ground varies from almost zero to infinity. This resultant impedance, over several cycles of the carrier signal, appears as a finite resistance $R_a$ as shown in FIG. 4. The magnitude of $R_a$ depends on the conduction angle of $T_2$. $R_t$ is the series combination of $R_1$ and $R_a$ which forms the emitter resistance of $T_1$. $R_t$ together with the proper choice of $R_2$, $R_3$, $R_L$ and B+ determines the DC design criteria of transistor $T_1$ for a Class A amplifier.

Capacitor $C_2$ couples the chrominance signal to the base of transistor $T_1$. The equivalent circuit is shown in FIG. 4. The voltage gain of the transistor amplifier $T_1$ depends on the ratio of $R_L$ to $R_t$. Maximum gain will be obtained when $R_t$ is a minimum. $R_t$ is at a minimum when the absolute value of $R_a$ is a minimum. The instantaneous value of $R_a$ is a function of the conduction angle of $T_2$. The efficiency and frequency response of the demodulator are inversely related to one another. Therefore for a given frequency response the efficiency is fixed. Furthermore, the frequency response may be increased by reducing $R_L$.

Figure 2:
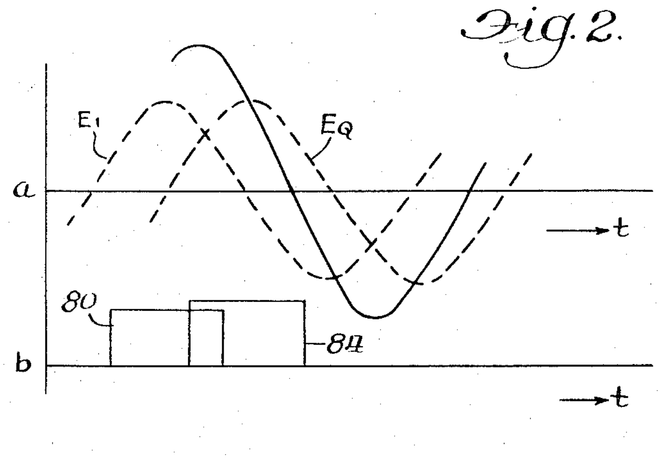
FIG. 2 is a diagram illustrative of the phase and time relationships between a typical television chrominance signal and the sampling intervals during synchronous amplitude demodulation.

FIG. 2 further illustrates the operation of the demodulation circuit. The chrominance signal represented by the solid line extends along the time axis or abscissa. It is composed of component signal voltages $E_I$ and $E_Q$ shown respectively in broken lines. The color difference signals R–Y and B–Y, although not shown in FIG. 2*a*, would appear respectively similar to $E_I$ and $E_Q$, but displaced 33 electrical phase degrees to the right. The conduction time of the R–Y demodulator, 26, is shown in FIG. 2*b* schematically by means of the block 80 positioned on the time axis. Projecting the limits of block 80 to intersect with the chrominance signal and its component signals illustrated in FIG. 2*a* the demodulator circuit sampling interval with respect to the chrominance signal may be schematically visualized. The conduction time interval of the B–Y demodulator 28 is shown schematically by the block 84 positioned on the time axis of FIG. 2*b*, projecting the time interval represented by block 84 to intersect the chrominance signal curve in FIG. 2*a* the interval of sampling required to obtain the B–Y function may be visualized.

The phase angle of the sampling interval, that is, the phase angle of conduction of transistor $T_2$ may be regulated between the zero angle up to slightly less than 180° by varying the ratio of capacitor $C_1$ and 68, and resistor $R_4$ at 70. The gain in the demodulated output signal at the collector 46 of transistor $T_1$ may be regulated by adjusting the ratio of the resistances $R_t$ to $R_L$.

A variation of the embodiment of our invention illustrated in circuit of FIG. 3 may be obtained by substituting PNP transistors for the above specified NPN transistors $T_1$ and $T_2$ and altering the B+ power supplies to B– supplies.

To further specify the embodiment of our invention illustrated in the circuit shown in FIG. 3, we list the following circuit component specifications and values:

$T_1$, $T_2$ – Any general purpose high frequency transistor with suitable breakdown voltage.

| | | |
|---|---|---|
| $C_2$ | pf | .01 |
| $R_2$ | | 33k |
| $R_3$ | | 18k |
| $R_{load}$ | | 22k |
| B+ | volts | 250 |
| $C_1$ | mf | .01 |
| $R_4$ | | 3.3k |
| $R_1$ | ohms | 470 |

Circuit elements having the foregoing respective values inserted into the circuit of FIG. 3 will result in a conduction angle of approximately 120° angle.

It is to be understood that the above described embodiments and variations thereon are intended as merely illustrative of our invention, the scope of which is defined by the following claims.

We claim:

1. A demodulator system for amplitude demodulation of an input modulated signal comprising:
  a transistor having a base, an emitter and a collector, the modulated input signal being applied to the base and the demodulated signal output being taken from the collector;
  a gate connected between the transistor emitter and ground, said gate having an off-condition to cause said transistor to be inoperable and a conduction-condition to provide a current path for said transistor and thereby enabling said transistor to be operative for demodulating said modulated signal; and
  a source of a reference continuous wave (CW) signal coupled to said gate, whereby one portion of said CW signal causes said gate to operate in said conduction-condition and the remaining portion of said CW signal causes said gate to be in said off-condition.

2. The demodulator system of claim 1 wherein said gate comprises: a second transistor having a base, emitter and collector, the emitter being grounded, the collector being connected to the emitter of said first-mentioned transistor, said CW reference signal being applied to the base of said second transistor.

3. An AM demodulator and amplifier for synchronously demodulating a double sideband suppressed carrier wave having modulation at two different phases, comprising:
  a first and a second transistor, the transistors having respectively base, emitter and collector leads, the emitter of the first transistor being connected to the collector of the second transistor;
  bias means for biasing the first transistor for Class A operation, the modulated signal being applied to the base of the first transistor and the demodulated output signal being obtained from the collector lead of the first transistor;
  a carrier signal source, the carrier signal being applied to the base of the second transistor, the emitter of said second transistor being substantially at ground potential; and
  means for biasing the second transistor to cut off during one portion of said carrier wave cycle and saturating said second transistor during the remaining portion of said cycle, whereby the first transistor demodulates and amplifies the modulated signal during said one portion of the carrier cycle and is quiescent during said remaining portion of the carrier cycle.

4. A synchronous AM demodulator amplifier system for color television receivers in which the received chrominance signal is a double sideband suppressed carrier wave modulated on two axes, and in which a locally generated continuous wave carrier signal is provided within the receiver for reinsertion into the suppressed carrier chrominance signal during demodulation, the invention comprising in combination identical first and second demodulation and amplification circuits, the circuits comprising respectively:

first transistors having base, emitter and collector leads, the first transistors respectively being biased for Class A operation;
  second transistor means connected to the emitter leads of the respective first transistors, the respective second transistors being biased for conduction during one portion of a CW carrier signal cycle and for cutoff during the remaining portion of the cycle, the chrominance signals being applied to the respective first transistor bases, the demodulated output signals being obtained from the collector leads of the respective first transistors, the CW carrier signal being applied directly to the second transistor means in the first circuit, and being applied after a 90° phase shift to the second transistor means in the second circuit, whereby the chrominance signal is demodulated in said first circuit during said one portion of the CW cycle and the chrominance signal is demodulated in said second circuit during said one portion of said phase shifted CW signal.

5. A chrominance signal demodulator and amplifier system for color television receivers wherein the received chrominance signal is a double sideband suppressed carrier wave signal modulated on two axes, including:
  a continuous wave (CW) reference carrier signal generator;
  a phase shift means having an input and an output, said CW generator being coupled to said input, said output providing substantially said CW signal but phase shifted a predetermined number of degrees;
  a first and a second demodulator circuit, each of said demodulator circuits comprising:
    a first transistor having a base, emitter and collector, said chrominance signal being applied to the base;
    a second transistor having a base, emitter and collector, the collector of the second transistor being linked to the emitter of the first transistor, the emitter of the second transistor being substantially at circuit ground, said reference CW signal being applied to the base of the second transistor of said first demodulator circuit and said CW signal from the output of said phase shift means being applied to the base of the second transistor of said second demodulator circuit, said second transistor of each demodulator circuit being cutoff during one portion of the corresponding CW signal to cause the corresponding first transistor to be inoperable, said second transistor of each demodulator circuit being saturated during the remaining portion of the CW signal to enable the respective first transistors to be operative and thereby cause the corresponding input chrominance signal to be demodulated 6. The signal demodulator and amplifier system of claim 5 wherein the collector of the first transistor of the first demodulator circuit is connected to the "red" color grid for a kinescope for color television and the collector of the first transistor of the second demodulator circuit is connected to the "blue" color grid for said kinescope, said collector of the first transistor of each of said demodulator circuits being connected to a summation circuit for deriving a signal at the output of the summation circuit for green, said output being connected to the "green" color grid of said kinescope.